United States Patent
Li et al.

(10) Patent No.: US 12,335,720 B2
(45) Date of Patent: Jun. 17, 2025

(54) METHOD AND APPARATUS FOR A SECURE CONNECTION BETWEEN AN ARTIFICIAL INTELLIGENCE SERVER AND A BASE STATION NODE

(71) Applicant: ZTE Corporation, Guangdong (CN)

(72) Inventors: Dapeng Li, Guangdong (CN); Yin Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 282 days.

(21) Appl. No.: 17/795,226

(22) PCT Filed: May 29, 2020

(86) PCT No.: PCT/CN2020/093125
§ 371 (c)(1),
(2) Date: Jul. 25, 2022

(87) PCT Pub. No.: WO2021/109499
PCT Pub. Date: Jun. 10, 2021

(65) Prior Publication Data
US 2023/0109389 A1 Apr. 6, 2023

(51) Int. Cl.
*H04W 12/03* (2021.01)
*H04W 12/0471* (2021.01)
*H04W 76/12* (2018.01)

(52) U.S. Cl.
CPC ....... *H04W 12/0471* (2021.01); *H04W 12/03* (2021.01); *H04W 76/12* (2018.02)

(58) Field of Classification Search
CPC .................. H04W 12/0471; H04W 12/041
(Continued)

(56) References Cited

U.S. PATENT DOCUMENTS

| 2012/0030739 | A1 | 2/2012 | Vadapalli et al. | |
| 2017/0310476 | A1* | 10/2017 | Sedlacek | H04L 63/164 |
| 2020/0195506 | A1* | 6/2020 | Peng | H04W 24/10 |

FOREIGN PATENT DOCUMENTS

| CN | 106845060 A | 6/2017 |
| CN | 107466465 A | 12/2017 |
(Continued)

OTHER PUBLICATIONS

International Search Report and Written Opinion for International Application No. PCT/CN2020/093125, mailed Feb. 25, 2021 (6 pages).
(Continued)

*Primary Examiner* — Qutbuddin Ghulamali
(74) *Attorney, Agent, or Firm* — Perkins Coie LLP (57) ABSTRACT

Methods and systems for securely sending user plane data from a base station to an Artificial Intelligence (AI) server via a mobile telecommunication network are disclosed herein. In one embodiment, a method performed by the base station located in a Radio Access Network (RAN) includes: sending an interface setup request to the (AI) server, receiving an interface setup response from the AI server, establishing, by exchanging cryptographic keys using an Internet Key Exchange (IKE) protocol, a data transport tunnel between the base station and the AI server based on an Internet Protocol Security (IPSec) network protocol, and sending the user plane data from the base station to the AI server for training artificial intelligence based models.

20 Claims, 10 Drawing Sheets

(58) Field of Classification Search
USPC .......................................................... 455/410
See application file for complete search history.

(56) References Cited

FOREIGN PATENT DOCUMENTS

| | | |
|---|---|---|
| CN | 109688597 A | 4/2019 |
| CN | 110163249 A | 8/2019 |

OTHER PUBLICATIONS

European Search Report for EP Patent Application No. 20896726.5, dated Jul. 7, 2023, 7 pages.
Bonawitz et al., "Practical Secure Aggregation for Privacy-Preserving Machine Learning," Proceedings of the 18th ACM/IFIP/USENIX Middleware Conference, ACMPUB27, New York, NY, USA, Session E5: Privacy-Preserving Analytics, CCS'17, Oct. 30-Nov. 3, 2017, Dallas, TX, USA, pp. 1175-1191, XP058698077, ISBN: 978-1-4503-5525-4, 17 pages.
Isaksson et al., "Secure Federated Learning in 5G Mobile Networks," ARXIV.ORG, Cornell University Library, 201 Olin Library Cornell University, Ithaca, NY 14853, Apr. 14, 2020, XP081643538, 7 pages.

\* cited by examiner

METHOD AND APPARATUS FOR A SECURE CONNECTION BETWEEN AN ARTIFICIAL INTELLIGENCE SERVER AND A BASE STATION NODE

CROSS-REFERENCE TO RELATED APPLICATION

This is a U.S. National Stage Application filed under 35 U.S.C. 371 based on International Patent Application No. PCT/CN2020/093125, filed May 29, 2020, the disclosure of which is incorporated herein by reference in its entirety.

FIELD

The present disclosure relates generally to communication systems, and more particularly, to a system for protecting user-plane and control-plane data transmission between a base station and an Artificial Intelligence (AI) server.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., time, bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, Long Term Evolution (LTE), and 5G networks.

A wireless communication network may include a number of base stations (BSs) that support communication for a number of user equipments (UEs). As will be described in more detail herein, a BS may also be referred to as an evolved Node Bs (eNBs or eNode Bs), a g Node B (gNB), an access point (AP), a radio head, a transmit receive point (TRP), a new radio (NR) BS, a 5G Node B, a radio access network (RAN) node, and/or the like.

In the wireless communication networks, the BSs provide a user-plane (UP) and a control-plane (CP) signaling between the BSs and the UEs. Those of skill in the art know that the UP carries the network user traffic and the CP carries routing configuration data. Moreover, UP and CP signaling protocols may also be used to establish communication between a BS and any other interface.

In the above described wireless communication systems, a large amount of data, including transport layer data (channel, spectrum and customer link), network layer data (signaling and management data), and various types of application layer data may be generated during the operation of the communication networks. This large amount of data can be used to create and train Artificial Intelligence models for adaptive network policy decision-making, predicting user and network requirements, resource orchestration and scheduling, and other network automation solutions. As such, UP and CP signaling protocols described above are used to establish communication between the BSs and an Artificial Intelligence (AI) server. Moreover, the BSs use the CP signaling protocol to send configuration commands to the AI server for setting AI models parameters and the UP signaling protocol to send measurement and training data to the AI server. Since the configuration commands, measurement and training data as well as AI models outputs are integral for the operation of the communication network, there is a need for a secure data transmission protocol between a BS and an AI server.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method for securely sending user plane data from a base station to an Artificial Intelligence (AI) server via a mobile telecommunication network includes at the base station located in a Radio Access Network (RAN) sending an interface request to the AI server, receiving an interface response from the AI server, establishing, by exchanging cryptographic keys using an Internet Key Exchange (IKE) protocol, a data transport tunnel between the base station and the AI server based on an Internet Protocol Security (IPSec) network protocol, and sending the user plane data from the base station to the AI server for training artificial intelligence based models.

In further embodiments, for securely sending user plane data from a base station to an Artificial Intelligence (AI) server further includes encrypting the user plane data using the cryptographic keys and encapsulating a payload having the user plane data into an Internet Protocol (IP) packet.

In another embodiment, a method for securely exchanging a first and second control plane data between a base station and an Artificial Intelligence (AI) server via a mobile telecommunication network includes at the base station located in a Radio Access Network (RAN) sending an interface setup request to the (AI) server, wherein the interface setup request comprises a first list of Internet Protocol Security (IPSec) control plane addresses of the base station, receiving an interface setup response from the AI server, wherein the interface setup request comprises a second list of Internet Protocol Security (IPSec) control plane addresses of the AI server, establishing, by exchanging cryptographic keys using an Internet Key Exchange (IKE) protocol, a data transport tunnel between the base station and the AI server based on an Internet Protocol Security (IPSec) network protocol, sending the first control plane data from the base station to the AI server for configuring artificial intelligence based models, receiving the second control plane data from the AI server for configuring the base station.

In further embodiments, the disclosure provides an apparatus that is configured to perform any one of the methods disclosed herein.

In further embodiments, the disclosure provides a non-transitory computer-readable storage medium storing computer-executable instructions that when executed perform any one of the methods disclosed herein.

In yet further embodiments, a wireless communication node includes a memory storing computer-executable instructions that when executed perform any one of the methods disclosed herein; and at least one processor, coupled to the memory, and configured to execute the computer-executable instructions.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

As discussed herein, a "wireless communication node" can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc., in accordance with the customary understanding of these terms in the art. Furthermore, as discussed herein, a "wireless communication device" can include, or be implemented as, a station (STA), a mobile terminal (MT), mobile station (MS), etc., in accordance with the customary understanding of these terms in the art. In the description of exemplary embodiments below, the "wireless communication node" is referred to as a base station "BS" and the "wireless communication device" is referred to as a user equipment "UE." It should be understood, however, that the scope of the present disclosure is not limited to these exemplary embodiments.

Figure 1:
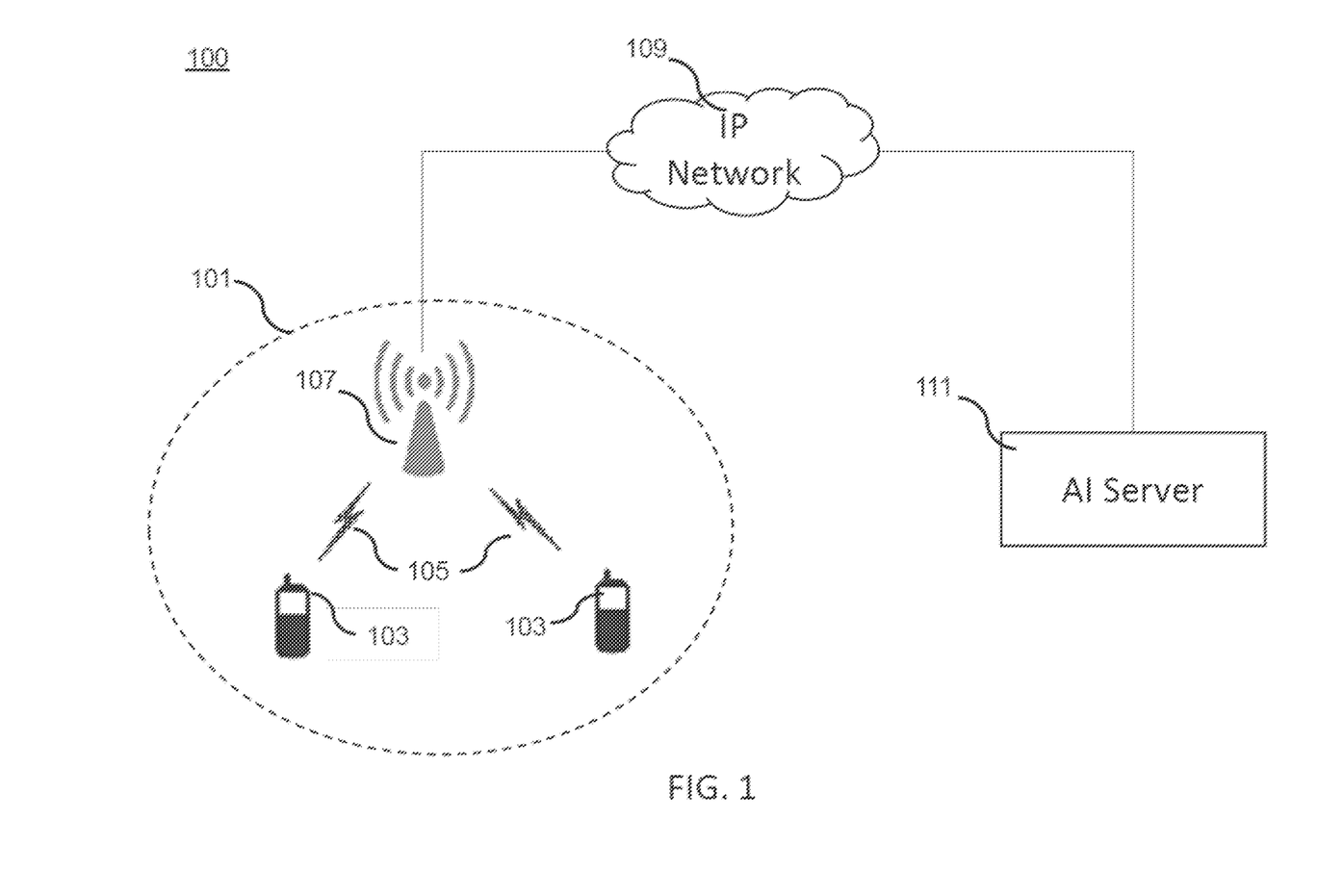
FIG. 1 is a schematic configuration diagram of a radio communication network connected to an AI server, in accordance with some embodiments of the disclosure.

FIG. 1 is a schematic configuration diagram of a radio communication network 101 connected to an AI server 111, in accordance with various embodiments of the present disclosure. In some embodiments, the wireless communication network 101 may be an LTE network or some other wireless network, such as a 5G NR network. The wireless communication network 101 may include a number of BSs 107 and a number of UEs 103. In some embodiments, the BSs 107 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

In addition, each BS 107 may provide communication coverage for a particular geographic area. In some embodiments, the geographic area covered by a BS and/or a BS subsystem serving this geographic area may be referred as a "cell." In other embodiments, each BS 107 may be interconnected to one another and/or to one or more other BSs through various types of backhaul links or by means of the X2 interface. The backhaul links may be wired or wireless. Moreover, each BS 107 in the radio communication network 101 may be connected by means of an IP network 109 to an Artificial Server 111. In some embodiments, the BS 107 may be connected to the Artificial Server 111 by means of the S1 interface.

UEs 103 may be dispersed throughout wireless network 101, and each UE may be stationary or mobile. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

In some embodiments, the AI server 111 may be configured to use statistical regression techniques (e.g., bagging tree, boosted tree, Support Vector Machine (SVM), linear regressors, etc.) to predict the performance that UEs 103 may experience in the future based on gathered radio performance measurements such as path-loss and throughput for particular frequencies and bandwidth settings received from the BSs 107. In particular, the AI server 111 may provide learning-based dynamic frequency and bandwidth allocation (DFBA) prediction models that yield significant performance gains. As another example, the AI server 111 may be configured to use a multi-layer perceptron (MLP) models to predict the coverage for either short or long distance communication in various environmental conditions.

Figure 2:
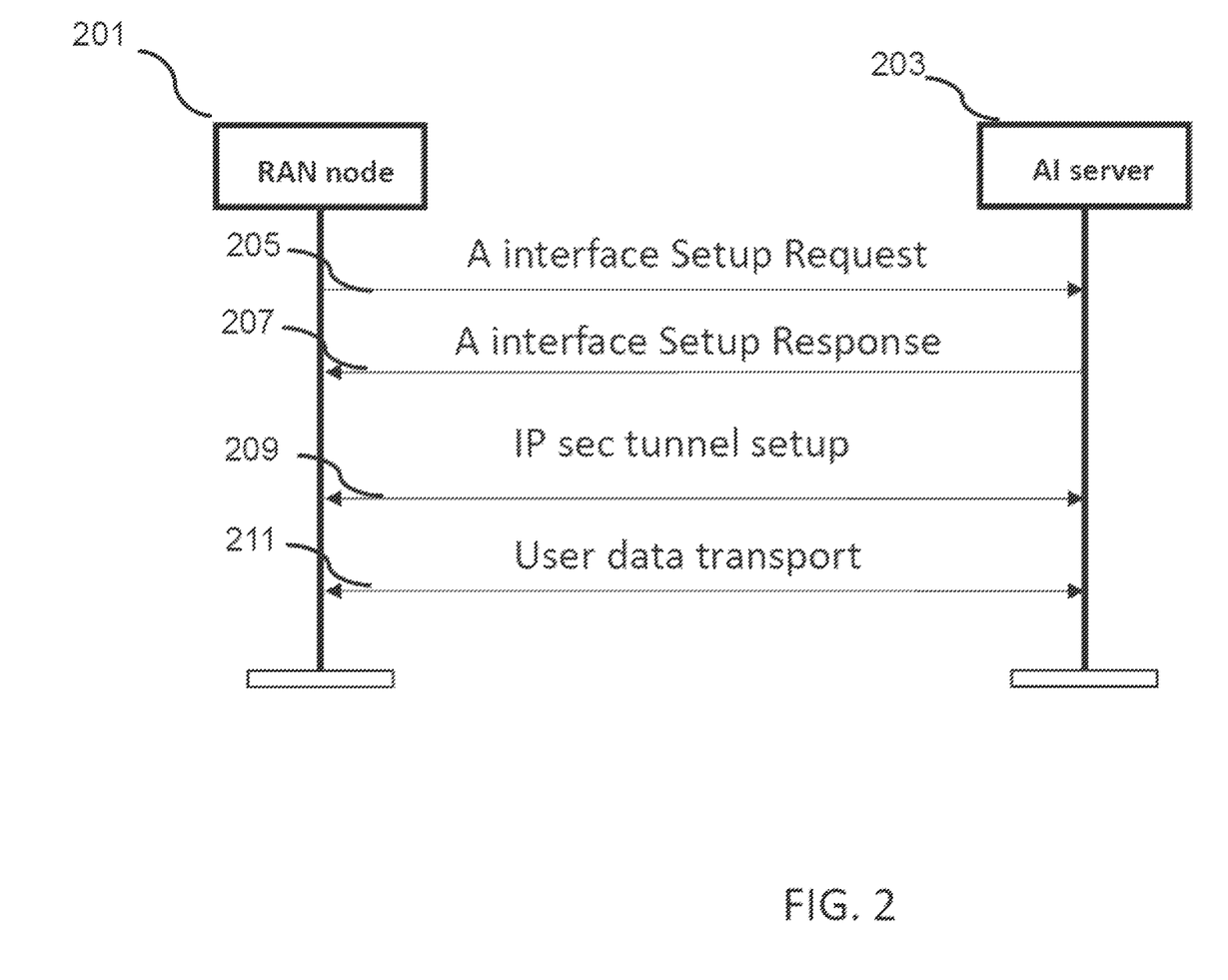
FIG. 2 is an operational sequence diagram illustrating a flow of operations with regard to establishing a secure IPSec tunnel between a RAN node and an AI server, in accordance with various embodiments of the disclosure.

FIG. 2 is an operational sequence diagram illustrating a flow of operations with regard to establishing a secure IPSec tunnel between a RAN node 201 and an AI server 203, in accordance with various embodiments of the disclosure. The interface between the RAN node 201 and the AI server 203 established as result of the operation described herein may be referred as an "A interface". In some embodiments, the "A interface" may be used to transfer user control planes signaling to the AI server 203 as well as results of machine learning models implemented on the AI server 203 to the RAN node 201. In various embodiments, the secure IPSec tunnel may use the IPSec protocol for transmitting user plane data described in ITU RFC7619 standard.

In further embodiments, the control plane signaling may include network policy configurations as well as measurement request parameters. In some embodiments, the user plane data includes measurement data and training data gathered at the RAN node 201. Moreover, the control plane signaling may be exchanged between the RAN node 201 and the AI server 203 using a Stream Control Transmission Protocol (SCTP) or Transmission Control Protocol (TCP). Furthermore, the user plane signaling may be exchanged between the RAN node 201 and the AI server 203 using, for example, the User Datagram Protocol (UDP), General Packet Radio Service (GPRS) Tunneling Protocol (GTP) tunnels, or HyperText Transfer Protocol (HTTP).

In some embodiments, the RAN node 201 may send an interface setup request message 205 to the AI server 203 to establish the control plane connection with the AI server 203. The request message may referred as an "A interface Setup Request". In various embodiments, the interface setup request message 205 may include a list of user plane IPSec addresses used by the RAN node 201 to provide a secure link for transmitting the user plane data between the RAN node 201 and the AI server 203. In some embodiments, if the user plane signaling between the RAN node 201 and the AI server 203 uses the GTP protocol to transfer user plane data, each IPSec address in the list of user plane IPSec addresses is associated with a GTP address list having GTP addresses. In further embodiments, an established GTP tunnel, which used the GTP protocol to transfer user plane, may only use the associated IPSec address, otherwise GTP tunnel may be denied access to the user plane or control plane data. In some embodiments, if other user plane data transmission protocols, such as File Transfer Protocol (FTP), HTTP, or HTTPS are used between the RAN node 201 and the AI server 203 for transmitting the user and control plane data, the address information (e.g., FTP address or URL for the HTTP or HTTPS protocols) or a protocol port number used by these data transmission protocols may be associated to each IPSec address in the list of user plane IPSec addresses.

After receiving the interface setup request message 205, initiated by the RAN node 201, the AI server 203 may send an interface response message 207. In some embodiments, the AI server 203 saves the content or the payload of the interface setup request message 205 before sending the interface response message 207. In some embodiments, the interface response message 207 may carry a list of user plane IPSec addresses of the AI server 203. Moreover, the interface response message 207 may additionally carry the address of GTP tunnel associated with each IPSec address in the list of user plane IPSec addresses. In further embodiments, a plurality of user plane IPSec addresses may be used to isolate, for example, measurement and training data belonging to different network slices. In this regard, isolation of different user planes may provide a more secure data transmission.

In some embodiments, the RAN node 201 and AI server 203 may exchange an IPSec tunnel configuration settings used to setup a secure link between RAN node 201 and the AI server 203. In various embodiments, after receiving the response message 207 from the AI server 203, the RAN node may establish an IPSec tunnel between the RAN node 201 and the AI server 203 by exchanging the IPSec tunnel configuration parameters 209 such as cryptographic keys through the Internet Key Exchange (IKE) protocol. In some embodiments, the RAN node 201 and the AI server 203 may establish multiple IPSec tunnels between the RAN node 201 and the AI server 203 for transmitting user plane data. In further embodiments, after the RAN node 201 and the AI server 203 establish the IPSec tunnel, the RAN node 201, at step 211, may send user plane data through the IPSec tunnel. Moreover, the AI server 203, at step 211, may also send its user plane data 211 through the same IPSec tunnel. In various embodiments, prior to sending the user plane data such as the measurement data or training data, the payload comprising of the user plane data may be encrypted and encapsulated according to the requirements of IPSec protocol described in ITU RFC7619 standard.

Figure 3:
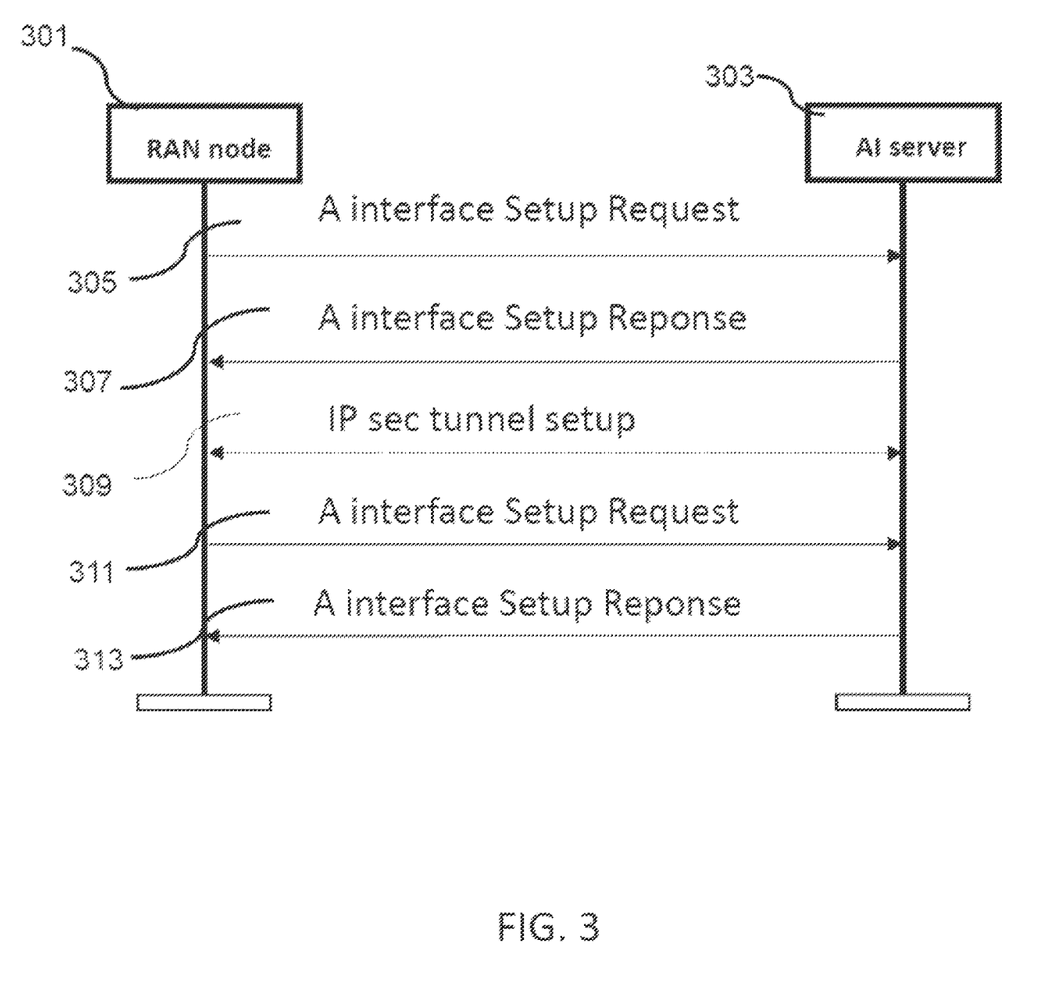
FIG. 3 is an operational sequence diagram illustrating a flow of operations with regard to establishing a secure IPSec tunnel for transmitting control plane data between a RAN node and an AI server, in accordance with some embodiments of the disclosure.

FIG. 3 is an operational sequence diagram illustrating a flow of operations with regard to establishing a secure IPSec tunnel for transmitting control plane data between a RAN node 301 and an AI server 303, in accordance with some embodiments of the disclosure. In some embodiments, the RAN node 301 and the AI server 303 exchange control plane data comprising of initial parameters for configuring an IPSec tunnel between the RAN node 301 and the AI server 303. More specifically, after the initial parameters exchange, the RAN node 301 and the AI server 303 may modify or delete the initial control plane connection. In some embodiments, if a new control plane secure connection is needed, the RAN node 301 may initiate a new "A interface" establishment procedure for transmitting control plane data using the existing IPSec tunnel.

Operations performed by the RAN node 301 and the AI server 303 for establishing a secure link for the control plane data transmission mentioned above are described in details below. As shown in FIG. 3, the RAN node 301 may send an interface request message 305 to the AI server 303 to establish the control plane connection with the AI server 303. In some embodiments, the interface request message 305 may carry a list of the control plane IPSec addresses or Datagram Transport Layer Security (DTLS) addresses that may be used by the RAN node 301 to establish a secure link for exchanging the control plane data between the RAN node 301 and the AI server 303.

In some embodiments, if the control plane signaling between the RAN node 301 and the AI server 303 uses the Stream Control Transmission Protocol (SCTP) protocol to transfer control plane data, each IPSec or DTLS address in the list of control plane IPSec addresses is associated with a SCTP address list having SCTP addresses. In further embodiments, an established SCTP connection, which uses the SCTP protocol to transfer control plane data, may only use the associated IPSec or DTLS address, otherwise SCTP connection may be denied access to the control plane data. In some embodiments, if other user plane data transmission protocols, such as File Transfer Protocol (FTP), HTTP, or HTTPS are used between the RAN node 301 and the AI server 303 for transmitting the user and control plane data, the address information (e.g., FTP address or URL for the HTTP or HTTPS protocols) or a protocol port number used by these data transmission protocols may be associated to each IPSec or DTLS address in the list of control plane IPSec or DTLS addresses.

In some embodiments, when the AI server 303 receives the interface request message 305 initiated by the RAN node 301, the AI server 303 sends an interface control plane response message 307. In various embodiments, the AI server 303 may save the content or the payload of the interface request message 305 before sending the interface control plane response message 307. In some embodiments, the interface response message 307 may carry a list of control plane IPSec or DTLS addresses of the AI server 303. Moreover, the interface response message 307 may additionally carry the address of SCTP connections associated with each IPSec or DTLS address in the list of control plane IPSec or DTLS addresses. In further embodiments, a plurality of control plane IPSec or DTLS addresses may be used to isolate, for example, measurement and training data belonging to different network slices. In this regard, isolation of different control planes may provide a more secure data transmission.

In some embodiments, the RAN node 301 and AI server 303 may exchange an IPSec tunnel or DTLS connection configuration settings used to setup a secure link for transmitting control plane data between RAN node 301 and the AI server 303. In various embodiments, after receiving the response message 307 from the AI server 203, the RAN node may establish an IPSec tunnel DTLS connection between the RAN node 301 and the AI server 303 by exchanging the IPSec tunnel configuration parameters 309 such as cryptographic keys through the Internet Key Exchange (IKE) protocol. In some embodiments, the RAN node 301 and the AI server 303 may establish multiple IPSec tunnels or DTLS connections between the RAN node 301 and the AI server 303 for transmitting control plane data.

In further embodiments, the RAN node 301 may use the established IPSec tunnel to re-establish a secure control plane connection between the RAN node 301 and the AI server 303. For example, as shown in FIG. 3, the RAN node 301 may send a new interface request message 311 and the AI server may send a new interface response message 313 in order to establish a new secure control plane connection.

Figure 4:
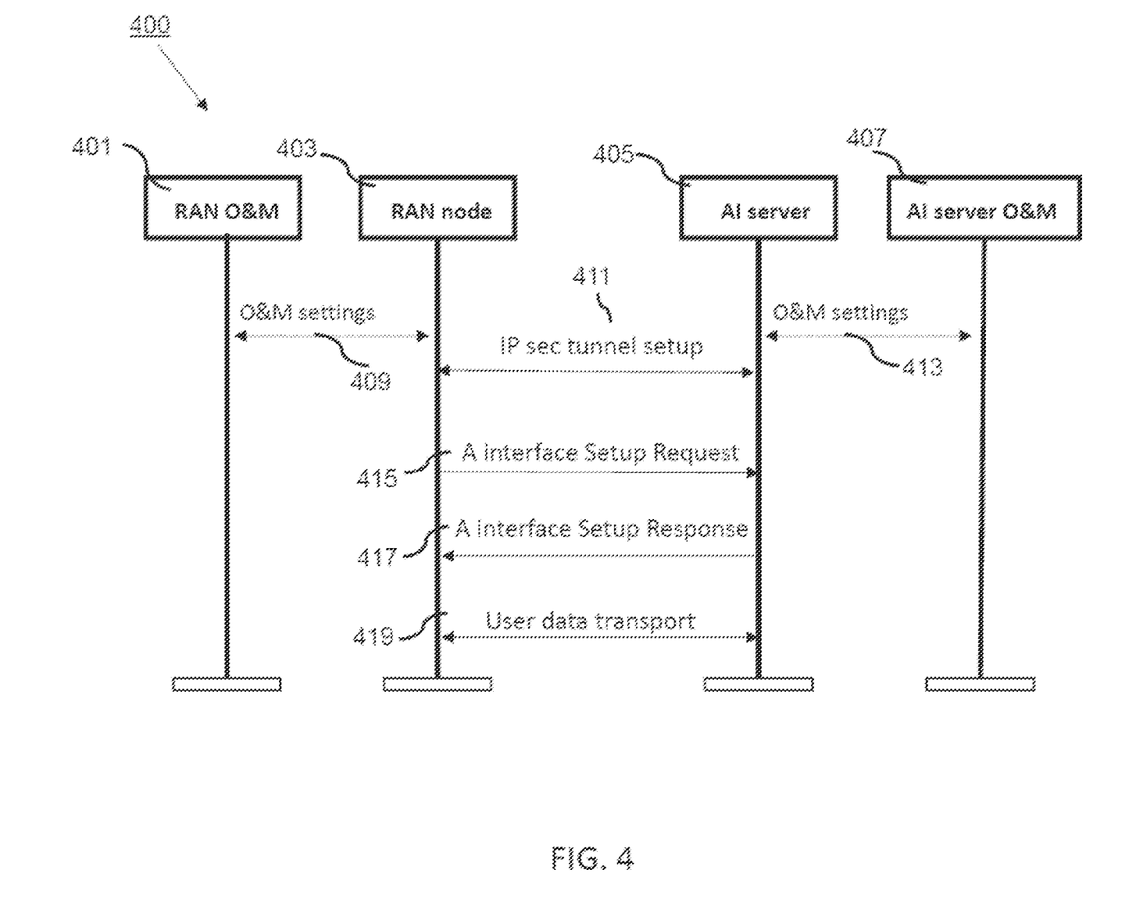
FIG. 4 is an operational sequence diagram illustrating a flow of operations with regard to establishing a secure IPSec tunnel between a RAN node and an AI server for exchanging an Operation and Maintenance (O&M) configurations, in accordance with various embodiments of the disclosure.

FIG. 4 is an operational sequence diagram illustrating a flow of operations with regard to establishing a secure IPSec tunnel between a RAN node 401 and an AI server 405 for exchanging an Operation and Maintenance (O&M) configurations, in accordance with various embodiments of the disclosure. In some embodiments, a RAN node operations and management (O&M) system 401 may be used to determine optimal settings for the RAN node 403. In other embodiments, an AI server operations and management (O&M) system 407 may be used to determine optimal settings for the AI server 407. In some embodiments, the O&M systems 401 and 407 may be implemented as software (i.e., computer executable instructions) stored in a non-transitory computer-readable medium that when executed by processor allows the network operators to configure BSs 107 or AI servers 111. As such, O&M systems 401 and 407 may provide O&M settings 409 and 413 used to configure various parameters of operation of the RAN node 403 and the AI server 405.

In various embodiments, the O&M settings 409 can include settings for tuning the RAN node 403 for optimal coverage, capacity, or performance. In some embodiments, O&M settings 409 can include adjustments for the uplink/downlink gain of signals transmitted by the RAN node 403 to compensate for detected noise within the RAN node 403. In other embodiments, O&M settings 409 may include re-allocating power levels of downlink signals transmitted by RAN node 403 to account for changing traffic conditions. In some embodiments, the O&M settings 413 may include a list of machine learning models and their associated parameters. In further embodiments, the O&M settings 409 and 413 may include necessary settings for configuring a secure communication link between the RAN node 403 and the AI server 405. In addition, O&M system can also provide cipher keys, authentication, or certification IDs to the AI server 405 or the RAN node 403.

In further embodiments, the RAN node O&M system 401 may provide a list of IPSec addresses of the AI server 405 and a list of General Packet Radio Service (GPRS) Tunneling Protocol addresses associated with IPSec addresses of the AI server 405. Similarly, the AI server O&M system 407 may provide all necessary configurations to the AI server 405 to establish a secure communication link with the RAN node 403. For example, the AI server O&M system 407 may provide the AI server 405 a list of IPSec addresses of the RAN node 403 and a list of General Packet Radio Service (GPRS) Tunneling Protocol addresses associated with the IPSec addresses of the RAN node 403.

The RAN node 403 and the AI server 405 may perform a similar sequence of operations to establish a secure communication link as described in FIG. 1. Moreover, after establishing a secure IPSec tunnel by exchanging IPSec tunnel setup configuration parameters 411, the RAN node 403 and the AI server 405 may establish a secure control plane connection on top of the existing IPSec tunnel. In some embodiments, in order to establish a secure control plane connection on top of the existing IPSec tunnel, the RAN node 403 may send an interface request message 415 to the AI server. In various embodiments, the interface request message 415 may include similar information as in the interface request message 500C described in further details below. Next, the AI server 405 may send an interface response to the RAN node 403 in response to receiving the interface request message 415. Subsequently, at step 419, after the RAN node 403 and the AI server 405 establish secure IPSec tunnels, the RAN node 403 and the AI server 405 may transport user plane as well as control plane data.

Figure 5A:
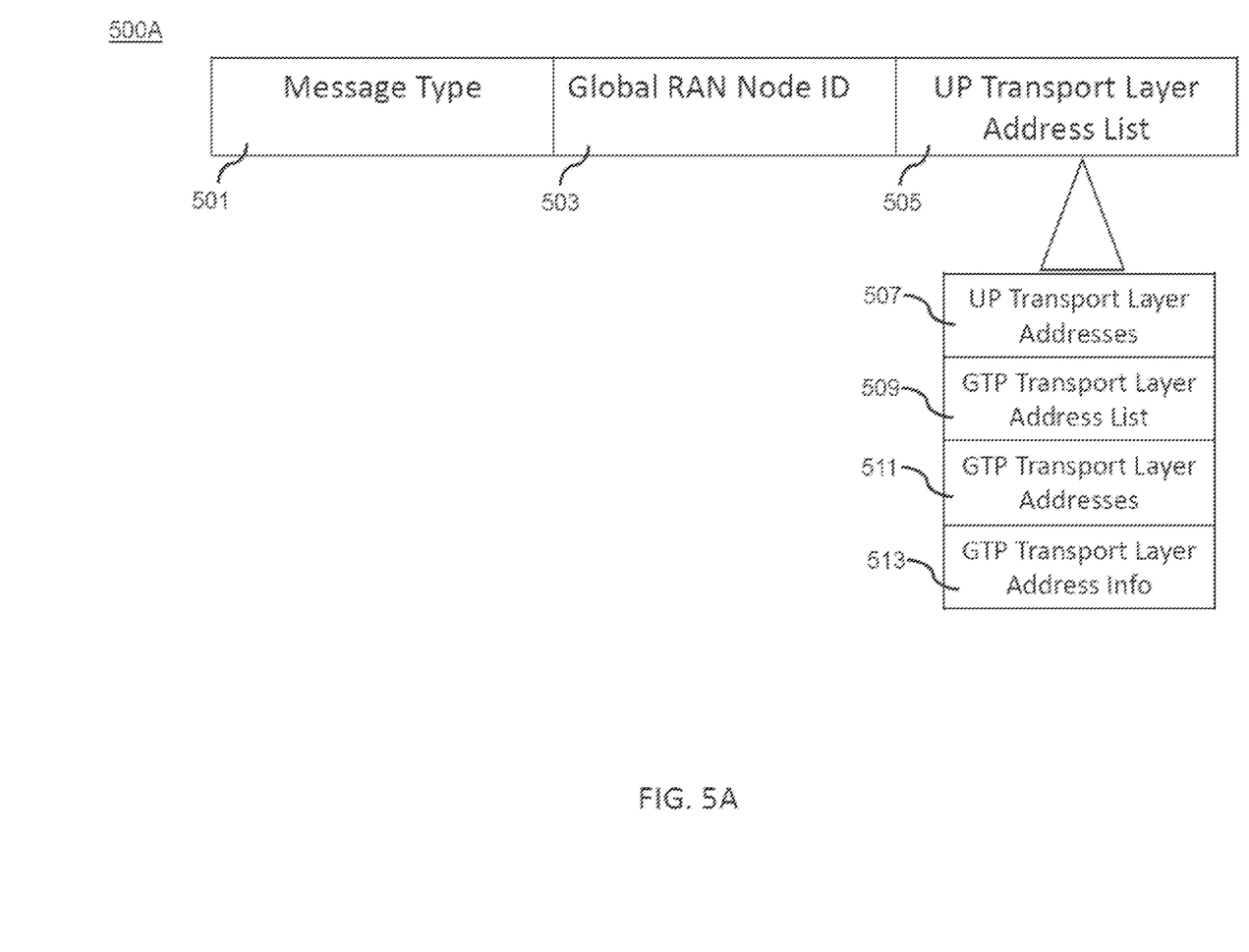
FIGS. 5A-5C illustrate examples of various structures of interface request messages, in accordance with some embodiments of the disclosure.
Figure 5B:
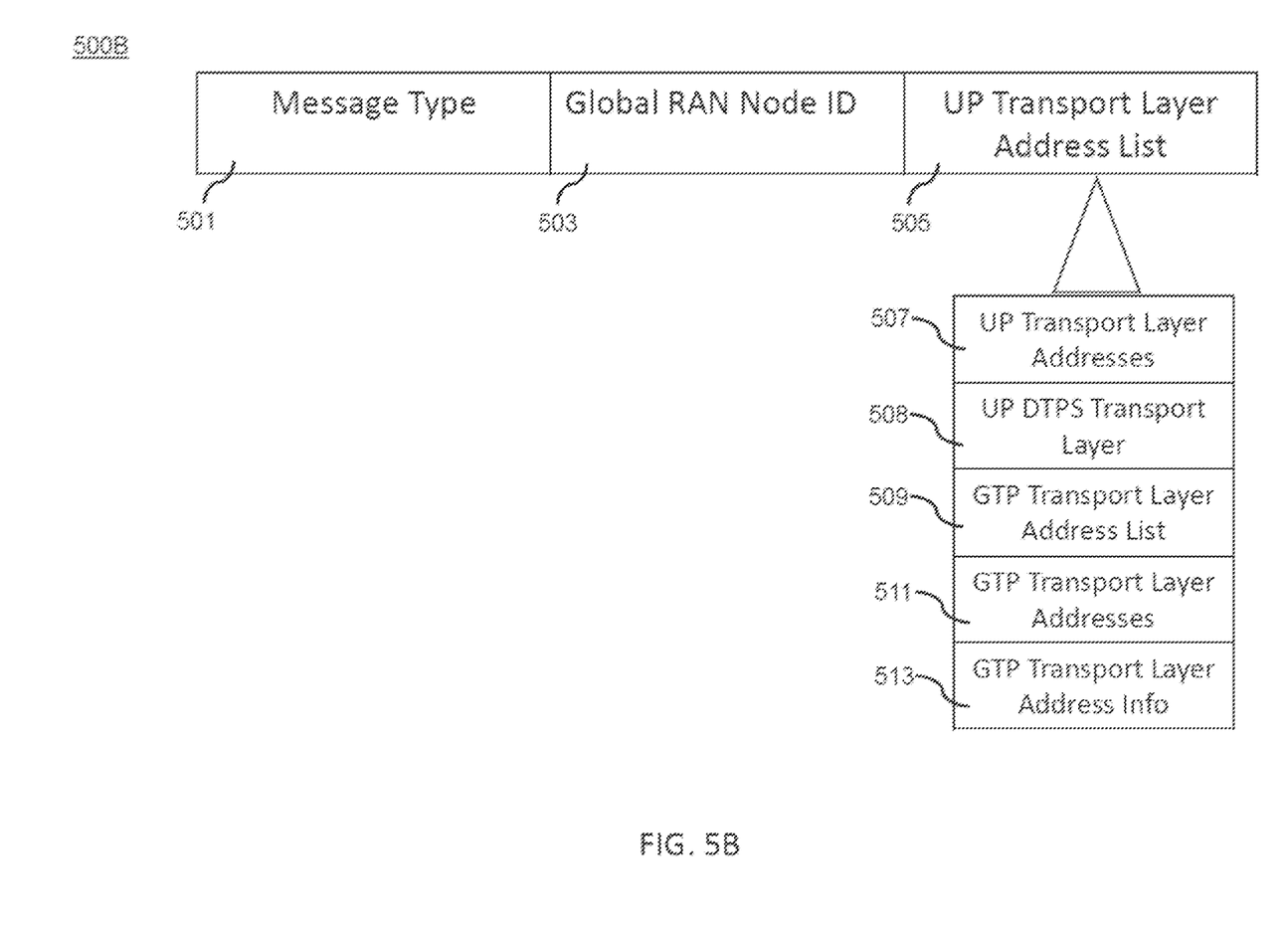
Figure 5C:
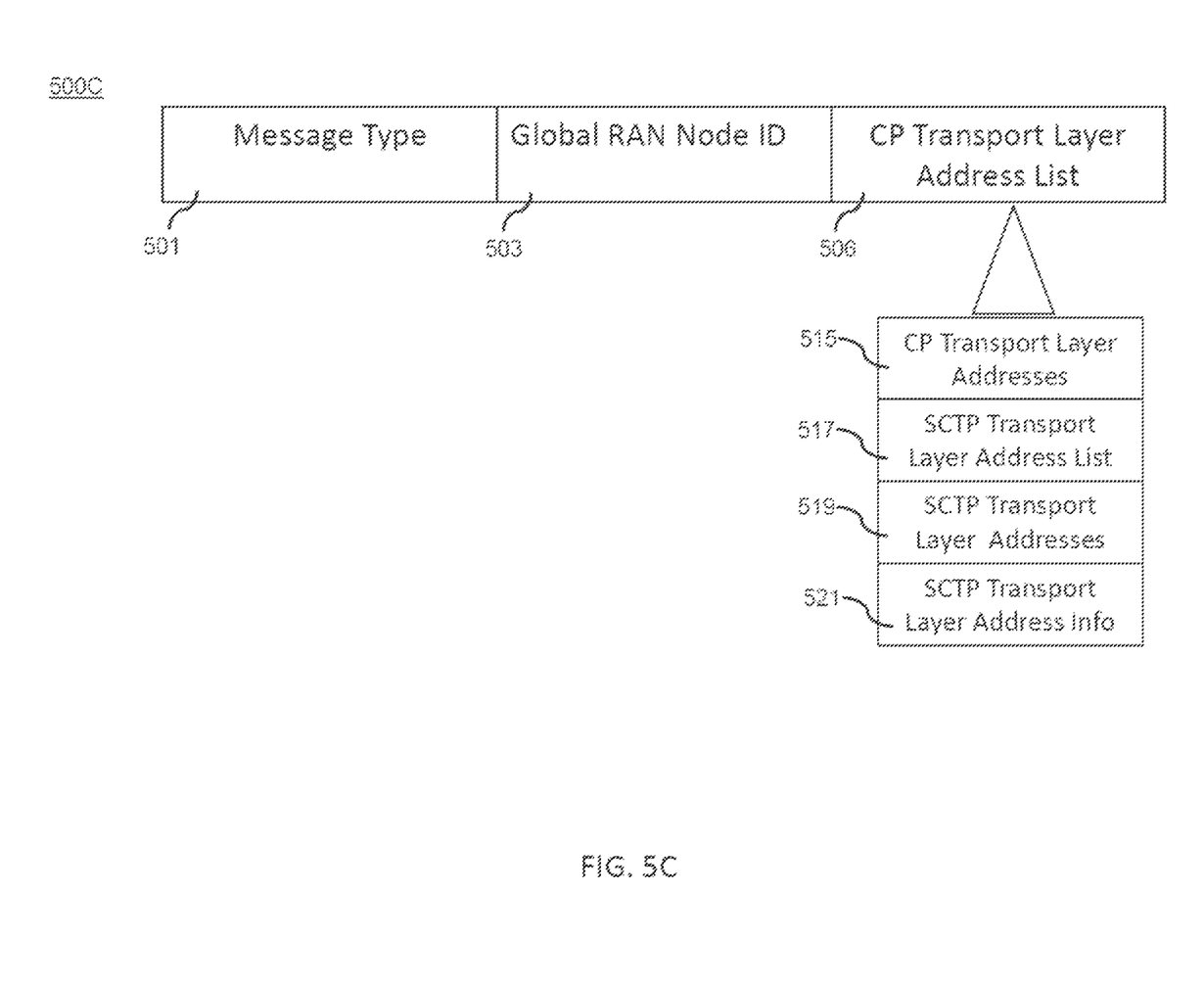

FIGS. 5A-5C illustrate examples of various structures of the interface request messages 205, 305, and 415 shown in FIGS. 2, 3, and 4, respectively, in accordance with some embodiments of the disclosure.

Referring to FIG. 5A, in some embodiments, a structure 500A of the interface request messages 205, 305, and 415 may include a message type 501 that indicates the type of the request being made. For example, the message type 501 may carry various attributes for describing the type of the interface requested. Moreover, the interface request messages 205, 305, and 415 may also include a global RAN node ID 503. In some embodiments, the global RAN node ID 503 is a unique identifier of the RAN node 201 (FIG. 2). Furthermore, in some embodiments, the interface request may include a list 505 of user plane addresses provided by the RAN node 201 to the AI server 203. In various embodiments, the list 505 of user plane addresses may include multiple IPSec user plane transport addresses 507.

In other embodiments, the list 505 may include user plane addresses to be modified or deleted. In addition, each IPSec user plane transport address may include a list of associated GTP transport addresses 509 that comprises of GTP transport addresses 511. Furthermore, the list 505 of user plane addresses may also include GTP transport address information 513 for each GTP transport address. In some embodiments, a length of the list 505 of user plane addresses may be preset to a first maximum number of user plane addresses. A length of the list 509 of associated GTP transport addresses may be preset to second first maximum number of GTP addresses.

In some embodiments, the list 505 of user plane addresses may include multiple DTLS transport addresses used for establishing the secure link between the RAN node and the AI server, as shown in a structure 500B of FIG. 5B illustrating the interface request message. In further embodiments, the interface request message may include a list 506 of control plane addresses used for establishing a secure control plane connection link between the RAN node and the AI server as shown in a structure 500C of FIG. 5C illustrating the interface request message. As shown in FIG. 5C, the list 506 of control plane addresses may include multiple IPSec or DTLS control plane transport addresses 515. In addition, each IPSec or DTLS control plane transport address may include a list of associated SCTP transport addresses 517 that comprises of SCTP transport addresses 519. Furthermore, the list 506 of control plane addresses may also include SCTP transport address information 521 for each SCTP transport address. In some embodiments, a length of the list 506 of control plane addresses may be preset to a first maximum number of user plane addresses. A length of the list 517 of associated SCTP transport addresses may be preset to second first maximum number of SCTP addresses.

Figure 6:
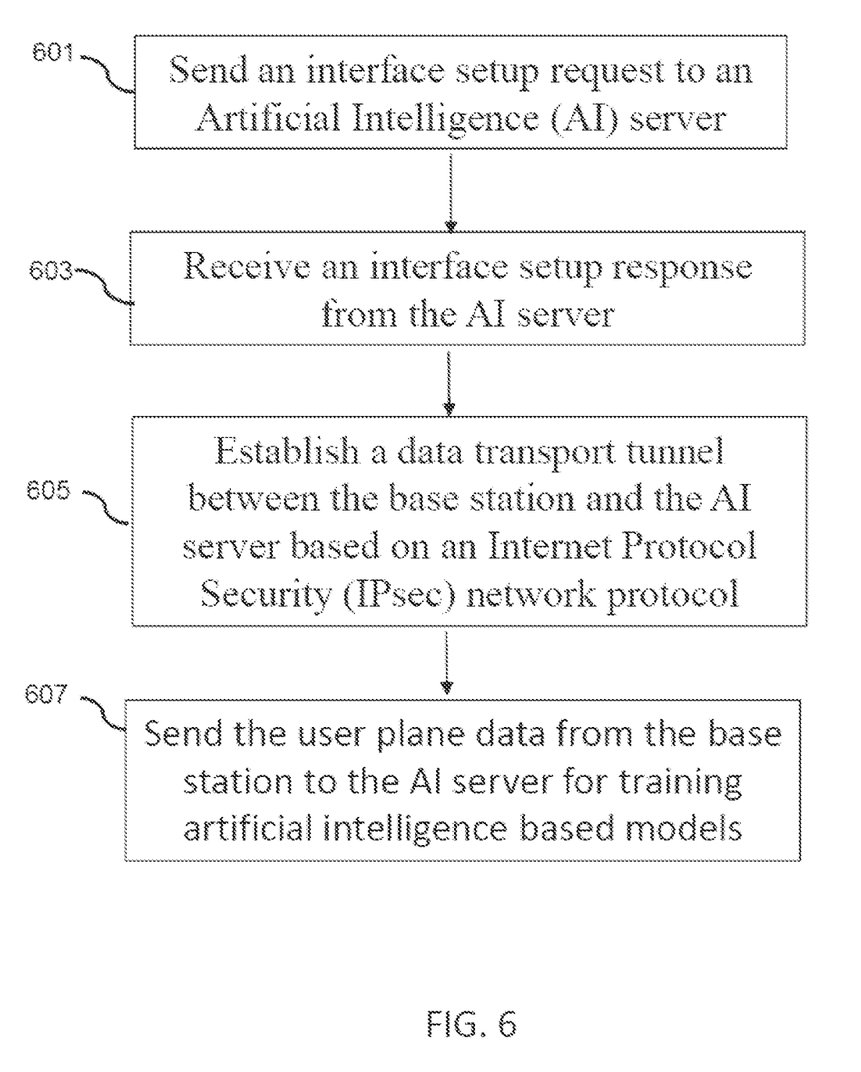
FIG. 6 is a block diagram of a flowchart of a method for establishing a secure IPSec tunnel between a RAN node and an AI server, in accordance with various embodiments of the disclosure.

FIG. 6 is a block diagram of a flowchart of a method for establishing a secure IPSec tunnel between a RAN node and an AI server, in accordance with various embodiments of the disclosure. In some embodiments, the flowchart shown in FIG. 6 may be performed, e.g., by the AI server 111.

In block 601, the BS 107 may send an interface setup request to the AI server 111. In block 603, the BS 107 may receive an interface setup response from the AI server 111. In some embodiments, the AI server 111 sends the interface setup response in response to receiving the interface setup request from the BS 107. In block 605, the BS 107 and the AI server 111 may establish a data transport tunnel between the BS 107 and the AI server 111 based on an Internet Protocol Security (IPSec) network protocol. In block 607, the BS 107 and the AI server 111 may send the user plane data from the BS 107 to the AI server 111 for training artificial intelligence based models. In some embodiments, the BS 107 may encrypt the user plane data using the cryptographic keys. In further embodiments, the BS 107 may encapsulating a payload carrying the user plane data into an Internet Protocol (IP) packet.

Figure 7:
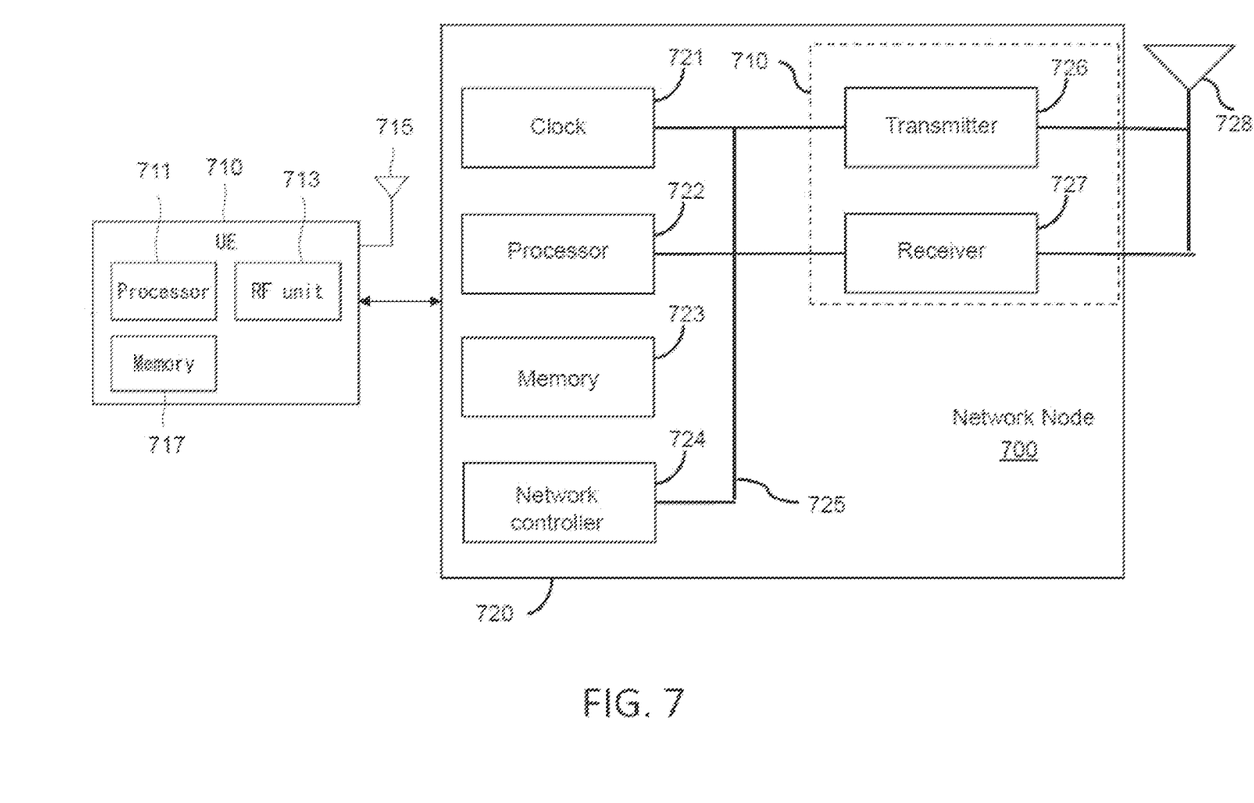
FIG. 7 illustrates a block diagram of wireless communication system comprising of a network node and a user equipment, in accordance with various embodiments of the disclosure.

FIG. 7 illustrates a block diagram of wireless communication system that includes a network node (NN) 700 and a user equipment 710, in accordance with various embodiments of the disclosure. The NN 700 is an example of a wireless communication node that can be configured to implement the various methods described herein. In some embodiments, the NN 700 may be wireless communication node such as a radio access network node (RAN node), as described herein. In other embodiments, the NN 700 may be a wireless communication device such as a base station (BS), as described herein. As shown in FIG. 7, the NN 700 includes a housing 720 containing a system clock 721, a processor 722, a memory 723, a transceiver 710 comprising a transmitter 726 and receiver 727, and a network controller 724.

In this embodiment, the system clock 721 provides the timing signals to the processor 722 for controlling the timing of all operations of the NN 700. The processor 722 controls the general operation of the NN 700 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 723, which can include both read-only memory (ROM) and random access memory (RAM), can provide instructions and data to the processor 722. A portion of the memory 723 can also include non-volatile random access memory (NVRAM). The processor 722 typically performs logical and arithmetic operations based on program instructions stored within the memory 723. The instructions (a.k.a., software) stored in the memory 723 can be executed by the processor 722 to perform the methods described herein. The processor 722 and memory 723 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 710, which includes the transmitter 726 and receiver 727, allows the NN 700 to transmit and receive data to and from an external network node (e.g., a BS, UE, or AI server). An antenna 728 is typically attached to the housing 720 and electrically coupled to the transceiver 710. In various embodiments, the NN 700 includes (not shown) multiple transmitters, multiple receivers, and multiple transceivers. In some embodiments, the antenna 728 includes a multi-antenna array that can form a plurality of beams each of which points in a distinct direction in accordance with MIMO beamforming techniques.

As further shown in FIG. 7, a user equipment (UE) 710 includes a processor 711, a memory 717, and a RF unit 713. In some embodiments, layers of a radio interface protocol may be implemented by the processor 711. The memory 717 may be connected to the processor 711 and configured to store programs for processing and controlling the processors 711. The RF unit 713 may be connected to the processor 711 and configured to transmit and/or receive an uplink (UL)-downlink (DL) signal. Further, the UE 710 may have a single antenna or multiple antennas 715.

The network controller 724 may be implemented as part of the processor 722 programmed to perform the functions herein, or it may be a separate module implemented in hardware, firmware, software or a combination thereof. In accordance with various embodiments, the network controller 724 is configured to transmit and receive data to and from an external device, such as the AI server 111 (FIG. 1). In some embodiments, the network controller 724 can be implemented as software (i.e., computer executable instructions) stored in a non-transitory computer-readable medium that when executed by processor 722, transform the processor 722 into a special-purpose computer to perform the secure data transmission operations described herein.

The various components and modules discussed above within housing 720 are coupled together by a bus system 725. The bus system 725 can include a data bus and, for example, a power bus, a control signal bus, and/or a status signal bus in addition to the data bus. It is understood that the modules of the NN 700 can be operatively coupled to one another using any suitable techniques and mediums. It is further understood that additional modules (not shown) may be included in the NN 700 without departing from the scope of the disclosure.

Figure 8:
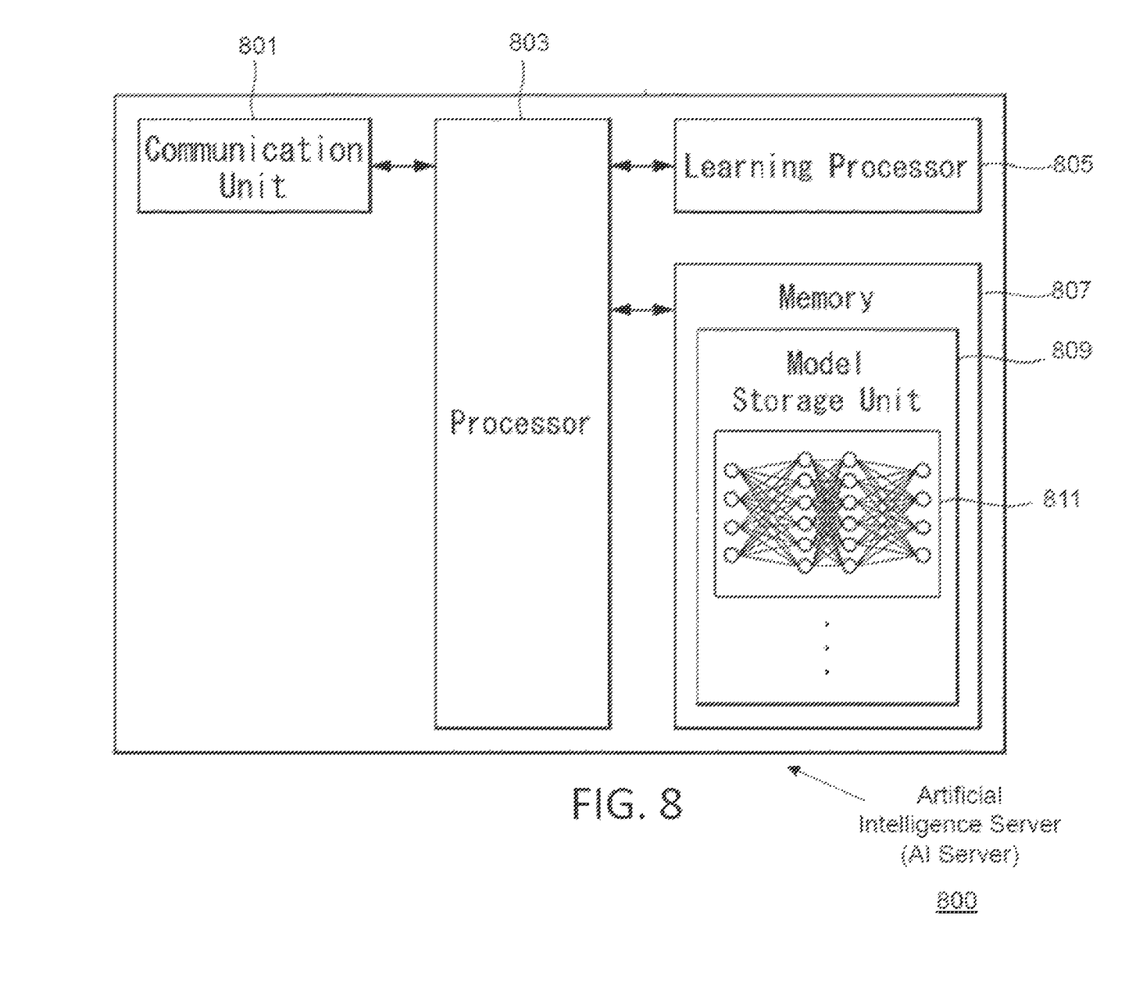
FIG. 8 illustrates an example of an AI server configured to perform the methods disclosed herein, in accordance with various embodiments of the disclosure.

FIG. 8 illustrates an example of an AI server 800 configured to perform the methods disclosed herein, in accordance with various embodiments of the disclosure. In some embodiments, the AI server 800 may include a communication unit 801, a memory 807, a learning processor 805 and a processor 803. The communication unit 801 may transmit and receive data to and from an external device, such as the BS 107 (FIG. 1). Moreover, in various embodiments, the memory 807 may include a model storage unit 809 configure to store model parameters for or more machine learning models 811. More specifically, the model storage unit 809 may store one or more models 811 which are being trained or have been trained through the learning processor 805.

In some embodiments, the learning processor 805 may train the artificial neural network model or a reinforcement learning model using the training data received from the BS 107. In other embodiments, the learning processor 805 may be used to train other machine learning models such as supervised and unsupervised learning models as well as deep leaning models. The one or more learning models 811 may be implemented as hardware, software or a combination of hardware and software. Moreover, the processor 803 may be configured to compute a result value of new input data using the one or more learning models 811, and may generate a response or control command based on the determined result value. For example, the processor 803 may be used to compute the network demand and to dynamically allocate the amount of network resources, topology setup, and bit rate, based on a supervised classifier model trained by the learning processor 805 using the bandwidth, latency, and jitter measurement data received from the BS 107 (FIG. 1). In further embodiments, the AI server 800 may be configured to perform distributed learning processing.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. An apparatus for securely transmitting user plane data to an Artificial Intelligence (AI) server via a mobile telecommunication network, comprising:
    a transmitter configured to transmit an interface request to the AI server and the user plane data from the apparatus to the AI server for training artificial intelligence based models;
    a receiver configured to receive an interface response from the AI server; and
    a processor configured to, in response to determining that the interface response is received from the AI server, establish, by exchanging cryptographic keys using an Internet Key Exchange (IKE) protocol, a data transport tunnel between a base station and the AI server based on an Internet Protocol Security (IPSec) network protocol.

2. The apparatus of claim 1, wherein the processor is further configured to encrypt the user plane data using the cryptographic keys and encapsulate a payload having the user plane data into an Internet Protocol (IP) packet.

3. The apparatus of claim 1, wherein the interface response comprises a list of Internet Protocol (IP) addresses associated with user planes.

4. The apparatus of claim 1, wherein the interface response comprises a General Packet Radio Service (GPRS) Tunneling Protocol (GTP) tunneling information.

5. The apparatus of claim 4, wherein the GTP tunnel information comprises an Internet Protocol (IP) address of the GTP tunnel and a unique tunnel endpoint identifier (TEID).

6. The apparatus of claim 1, wherein the interface request comprises a first list of IPSec addresses associated with user planes and wherein the IPSec addresses are used by the apparatus to transmit the user plane data.

7. The apparatus of claim 6, wherein the interface request further comprises a preset parameter determining a maximum number of the IPSec addresses in the first list; or
    wherein the interface request comprises a second list of General Packet Radio Service (GPRS) Tunneling Protocol (GTP) addresses associated with the IPSec addresses in the first list.

8. The apparatus of claim 1, wherein the interface request comprises a list of IPSec addresses to be modified or deleted.

9. The apparatus of claim 1, wherein the transmitter is further configured to transmit control plane to the AI server through a control plane data transport tunnel.

10. A method for securely sending user plane data from a base station to an Artificial Intelligence (AI) server via a mobile telecommunication network, the method comprising, at the base station located in a Radio Access Network (RAN) comprising:
    sending an interface request to the AI server;
    receiving an interface response from the AI server;
    in response to determining that the interface response is received from the AI server, establishing, by exchanging cryptographic keys using an Internet Key Exchange (IKE) protocol, a data transport tunnel between the base station and the AI server based on an Internet Protocol Security (IPSec) network protocol; and
    sending the user plane data from the base station to the AI server for training artificial intelligence based models.

11. The method of claim 10, further comprising:
    encrypting the user plane data using the cryptographic keys; and
    encapsulating a payload having the user plane data into an Internet Protocol (IP) packet.

12. An apparatus for securely receiving user plane data at an Artificial Intelligence (AI) server sent from a base station via a mobile telecommunication network, comprising:
    a receiver configured to receive an interface request from a base station and the user plane data from the base station for training artificial intelligence based models;
    a transmitter configured to transmit an interface response to the base station; and
    a processor configured to, upon the interface response being transmitted from the AI server, establish, by exchanging cryptographic keys using an Internet Key Exchange (IKE) protocol, a data transport tunnel between the base station and the apparatus based on an Internet Protocol Security (IPSec) network protocol.

13. The apparatus of claim 12, wherein the processor is further configured to decrypt the user plane data using the cryptographic keys.

14. The apparatus of claim 12, wherein the interface response comprises a list of Internet Protocol (IP) addresses associated with user planes.

15. The apparatus of claim 12, wherein the interface response comprises a General Packet Radio Service (GPRS) Tunneling Protocol (GTP) tunneling information.

16. The apparatus of claim 15, wherein the GTP tunnel information comprises an Internet Protocol (IP) address of the GTP tunnel and a unique tunnel endpoint identifier (TEID).

17. The apparatus of claim 12, wherein the interface request comprises a first list of IPSec addresses associated with user planes and wherein the IPSec addresses are used by the apparatus to transmit the user plane data.

18. The apparatus of claim 17, wherein the interface request further comprises a preset parameter determining a maximum number of the IPSec addresses in the first list; or
   wherein the interface request comprises a second list of General Packet Radio Service (GPRS) Tunneling Protocol (GTP) addresses associated with the IPSec addresses in the first list.

19. The apparatus of claim 12, wherein the interface request comprises a list of IPSec addresses to be modified or deleted.

20. The apparatus of claim 12, wherein the receiver is further configured to receive control plane data from the base station through a control plane data transport tunnel.

* * * * *